US00RE34042E

United States Patent [19]

Merino

[11] E Patent Number: Re. 34,042

[45] Reissued Date of Patent: Aug. 25, 1992

[54] WAVE SURFING SIMULATION APPARATUS

[76] Inventor: Dennis Merino, 2873 King Edward Dr., El Dorado Hills, Calif. 95630

[21] Appl. No.: 563,412

[22] Filed: Aug. 7, 1990

Related U.S. Patent Documents

Reissue of:

[64] Patent No.: 4,762,316
Issued: Aug. 9, 1988
Appl. No.: 5,943
Filed: Jan. 22, 1987

[51] Int. Cl.[5] ..... A63G 21/00

[52] U.S. Cl. ..... 472/117; 441/66

[58] Field of Search ..... 272/1 R, 1 B, 56.5 R; 441/40, 66

[56] References Cited

U.S. PATENT DOCUMENTS

| | | | |
|---|---|---|---|
| 695,444 | 3/1902 | Carson et al. . | |
| 1,133,489 | 3/1915 | Mauck . | |
| 1,478,345 | 12/1923 | Matheson . | |
| 1,648,196 | 11/1927 | Rohmer . | |
| 1,851,768 | 3/1932 | Hubbel | 272/1 B |
| 2,513,857 | 7/1950 | Friedrich | 441/66 |
| 2,853,720 | 9/1958 | Friedlander | 441/40 X |
| 2,982,547 | 5/1961 | Carrier | 272/56.5 R |
| 3,030,640 | 4/1962 | Gosman | 441/40 X |
| 3,083,652 | 4/1963 | Uyehara | 272/1 B X |
| 3,246,892 | 4/1966 | Grudoski . | |
| 3,307,209 | 3/1967 | Jackman . | |
| 3,363,268 | 1/1968 | Friedlander | 272/1 B |
| 3,432,182 | 3/1969 | Solipasso . | |
| 3,455,571 | 7/1969 | Dallera et al. . | |
| 3,679,025 | 7/1972 | Rummel | 272/56.5 R X |
| 3,715,120 | 2/1973 | Peltola . | |
| 3,908,556 | 9/1975 | Stuhmer . | |
| 3,923,301 | 12/1975 | Myers . | |
| 4,278,247 | 7/1981 | Joppe . | |
| 4,339,122 | 7/1982 | Croul | 272/56.5 R |
| 4,391,201 | 7/1983 | Bailey . | |
| 4,484,739 | 11/1984 | Kreinbihl et al. . | |

FOREIGN PATENT DOCUMENTS

| | | | |
|---|---|---|---|
| 2110944A | 6/1983 | United Kingdom | 272/1 B |

*Primary Examiner*—Richard E. Chilcot, Jr.
*Attorney, Agent, or Firm*—Poms, Smith, Lande & Rose

[57] ABSTRACT

Wave surfing simulation apparatus is disclosed comprising an elongated water slide adapted to rest on a supporting surface. The slide includes a plurality of water jet openings along the length thereof for spraying water on the upper surface of the slide and wetting the same when the slide is coupled to a source of fluid. A plurality of inflatable air chambers are associated with the slide at spaced locations along the slide and transverse thereto. These chambers give an undulating effect to the upper wetted surface of the slide. A belly board is provided adapted to slide or glide over the wetted undulated upper surface of the slide when the user lies on top of the board along the longitudinal length thereof from one end to the other. In this manner, a surfing effect is created by the gliding or sliding of the board over the wetted undulated surface.

18 Claims, 1 Drawing Sheet

WAVE SURFING SIMULATION APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to water toys; and, more particularly to a wave surfing simulation apparatus including a slide and surf board therefore.

2. Description of the Prior Art

Water toys are well known in the art and highly popular. One such water toy is disclosed in U.S. Pat. No. 2,982,547 and uses an elongated planar sheet which rests on a supporting surface, such as a lawn, and includes a plurality of water jets for wetting the upper surface. The user can then run or slide on top of the wetted surface. However the user can go off of the slide and be burned on the grass or ground or even run into surrounding objects. In addition, the impact of the body of the user on the upper surface of such slides is relatively hard and might hurt the user. Finally, such prior art slides are relatively boring and the user quickly loses interest.

Riding the waves in the ocean is a very popular pastime. The user has a surf or belly board, lies on top of the board, and catches the top of a wave as it begins to break at the shore. The user, under the force of the breaking waves, is propelled to the shore on top of the board. This sport is quite exciting but may be dangerous for small children or in violent wave action.

In U.S. Pat. No. 4,339,122 to Croul, there is disclosed a surfing slide which simulates ocean surfing. However, such slide is a commercial device, very complex and expensive and difficult to set up and take down. As illustrated, it requires a considerable area to set up and operate properly. The slide of Croul provides a relatively hard stiff surface and the user rides on a board which must be hard so as to deform the foam core of the panel sections to simulate wave action.

There is thus a need for a water sport toy that simulates the action of waves without the danger from such waves. Such a water sport should be quick and easy to set up, use and take down after use.

SUMMARY OF THE INVENTION

It is an object of this invention to provide a water toy that simulates wave surfing action.

It is still further an object of this invention to provide such a water toy that is quick and easy to set up, use and take down after use.

It is still further an object of this invention to carry out the foregoing object using inexpensive materials.

These and other objects are preferably accomplished by providing a wave surfing simulation apparatus including an elongated water slide adapted to rest on a supporting surface. The slide includes a plurality of water jet openings along the length thereof for spraying water on the upper surface of the slide and wetting the same when the slide is coupled to a source of a fluid. A plurality of inflatable air chambers are associated with the slide at spaced locations along the slide and transverse thereto. These chambers give an undulating effect to the upper wetted surface of the slide. A belly board is provided adapted to a glide or slide over the wetted undulated upper surface of the slide, when the user lies on top of the board, along the longitudinal length thereof from one end to the other. In this manner, a surfing effect is created by the gliding or sliding of the board over the wetted undulated surface.

DESCRIPTION OF THE PREFERRED EMBODIMENT

Figures 1, 2, 3, 4:
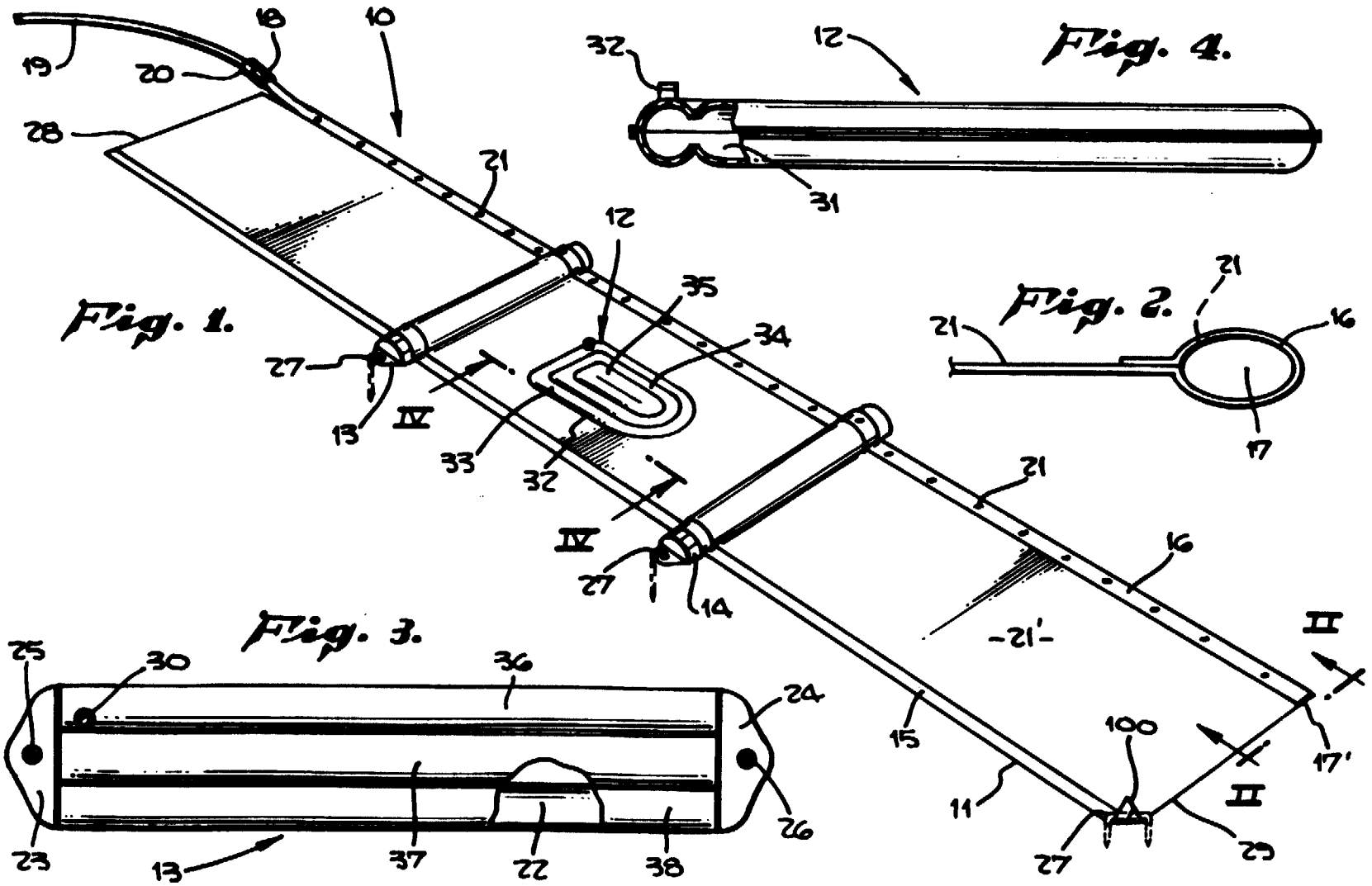
FIG. 1 is a perspective view of a wave surfing simulation apparatus in accordance with the teachings of the invention.
FIG. 2 is a view taken along lines II—II of FIG. 1.
FIG. 3 is a top plan view partly in section, of one of the components of the apparatus of FIG. 1 in deflated condition.
FIG. 4 is a view taken along lines IV—IV of FIG. 1, partly in section, of one of the components of the apparatus of FIG. 1.

Referring now to FIG. 1 of the drawing, wave surfing simulation apparatus 10 is shown having a flat planar flexible sheet 11, a separate surf glider surfboard or belly board 12 and a plurality, such as two, of spaced inflated tubes 13, 14.

Sheet 11 is made of a suitable flexible but strong inexpensive material, such as vinyl, or any other suitable plastic material, and preferably has a mid portion of a single ply thickness with double rolled edges 15, 16. Edge 16 (FIG. 2) forms an internal chamber 17 and terminates at the rear in a conventional internally threaded hose connector 18 fluidly communicating with the interior of chamber 17. Chamber 17 terminates at the front in a sealed end 17'. A conventional garden hose 19, leading to a source of water, may be connected via external threaded end 20, to connector 18. A plurality of spaced apertures 21 extend along the upper surface of edge 16 communicating with the interior chamber 17. These apertures 21 may be spaced close to each other and be of relatively small orifices. They may also be directed to or angled inwardly toward the central longitudinal axis of slide 11. For example, slide 11 may be 25 feet long and about 44 inches wide, and the apertures 21 may be at ⅛" spaced intervals forming over 500 apertures 11. It can be appreciated that, when hose 19 is connected to connector 18, and the water turned, the water sprays out of apertures 21 which act as jets spraying across the entire upper surface 21' of slide 11 as seen in FIG. 1.

If desired, the free ends of slide 11 may be anchored in any suitable manner, as by weights, tie-down straps, clamps embedded in the ground engaging the slide, etc. For example, corner 100 may be folded over a U-shaped anchor 27 which anchor 27 extends into the ground. The other corners may be folded in like manner.

Referring now to FIG. 3, one of the tubes 13, 14, which are identical, such as tube 13, is shown in its deflated condition. Tube 13 has a mid elongated inflatable chamber 22. This chamber 22 may be divided into one or more elongated fluidly interconnected chambers, such as chambers 36 to 38, to provide rigidly and support to tubes 13, 14. Each tube, such as tube 13 shown in FIG. 1, also has integral flanges 23, 24 at each end of chamber 22. A capped air inlet 30 fluidly communicates with the interior of chamber 22 for inflating the same. Apertures 25, 26 are provided in each end flange 23, 24, respectively, for receiving U-shaped anchors 27 (FIG.

1) therein for anchoring each tube 13, 14, in position. Thus, as seen in FIG. 1, each tube 13, 14 is located under slide 11 at a desired spaced location. For example, if slide 11 is 25 feet long, tube 13 may be about 8 feet from the end 28 thereof (FIG. 1) with tube 14 also about 8 feet away from the other end 29 thereof (the spacing therebetween thus being about 8 feet).

Each tube 13, 14 thus may have a chamber 22 about 44" long and may be about 1 foot in width when uninflated (about 9" in width and about 3" in thickness when inflated). Tubes 13, 14 may be of the same material as slide 11, such as vinyl.

Board 12 is shown in inflated condition in FIG. 4. Board 12 thus includes an inner buoyant air chamber 31 with a capped air inlet 32 (which may be pushed internally after inflating so as to be flush with the exterior as is well known in the art—inlet 30 being adapted to be similarly internally pushed-in).

As seen in FIG. 1, the outer periphery 32 of board 12 simulates a conventional so-called belly board used to surf over waves in the ocean. Such belly boards are in effect smaller versions of surf boards. As seen in FIG. 1, inner chamber 31 of board 12 may be formed by one or more inflatable chambers, such as outer chamber 33, inner chamber 34 and middle chamber 35, all fluidly interconnected to provide an outer ribbed support when inflated. Board 12 may also be of the same material as slide 11 and tubes 13, 14, such as vinyl plastic. Board 12 may also be of any suitable dimensions. For example, in the dimensions heretofore given for slide 11 and tubes 13, 14, board 12 may be about 12" wide at the rear tapering to about 10" wide at the front, about 21" long and about 2" in thickness when inflated.

In operation, slide 11 is laid out on a lawn or the like and a garden hose 19 is connected to fluid inlet 18. Tubes 13, 14 are inflated and placed under slide 11 at spaced locations as seen in FIG. 1 and anchored using anchors 27 or the like. Board 12 is also inflated. The water is turned on and sprays across the entire upper surface of slide 11. The child using the slide 11 glides along the top of slide 11 lying belly down on board 12 and over the bumps or undulations formed by the placement of tubes 13, 14. The height of such bumps or undulations may be adjusted slightly if desired by controlling the inflation of tubes 13, 14. In this manner, wave action is created using the placement of the inflated tubes 13, 14. The inflated belly board 12 cushions the user's body from hard impacts and grass burns should the user go off of the slide. The user slides or glides longer and faster over the slide 11 by using board 12. The spray jet inlets 21 spray the entire upper surface of the slide 11 eliminating dry spots. The doubled rolled edges 15, 16 provide safety and the slide 11 can be attached to any conventional garden hose.

It can be seen that there is disclosed a water slide that simulates wave action and allows the user to ride on a cushion of air recreating such wave action. The device disclosed herein is economical, inexpensive to manufacture, safe and quick and easy to set up. Although there is disclosed a specific embodiment of the device, such is only exemplary of the means for carrying out the invention and the invention is to be limited only by the appended claims.

I claim:

1. Wave surfing simulation apparatus comprising:

a flat planar elongated flexible slide having an upper planar surface and a lower planar surface with an elongated water chamber extending along at least one side thereof, a water inlet in fluid communication with one end of said water chamber, said water chamber having a plurality of water jets at spaced locations along the upper surface thereof adapted to spray water across substantially the entire upper surface of said slide when said inlet is coupled to a source of water;

a plurality of air chambers in the form of elongated inflatable tubes substantially oval in cross-section associated with the lower planar surface of said slide extending transverse to the longitudinal axis thereof providing an undulating surface to the upper planar surface of said slide, the oval shape of said tubes providing a smooth transitional surface from the upper planar surface of said slide over said undulating surface; and a simulated inflated belly board having a substantially flat bottom adapted to glide over the upper planar surface of said slide thereby providing a buoyant chamber of said belly board gliding over the buoyant chambers of said air chambers.

2. In the apparatus of claim 1 wherein each of said tubes includes a plurality of longitudinally extending fluidly interconnected chambers.

3. In the apparatus of claim 1 wherein each of said air chambers are separate independent inflatable tubes mounted under said slide in abutting engagement with the lower planar surface thereof.

4. In the apparatus of claim 1 wherein said inflated board includes an inner selectively inflatable and deflatable chamber.

5. In the apparatus of claim 4 wherein said inner chamber of said board is provided by a plurality of fluidly interconnected chambers.

6. In the apparatus of claim 4 wherein said board tapers from the rear to the front thereof to simulate a conventional surf or belly board.

7. In the apparatus of claim 1 wherein said slide is substantially 25 feet long and substantially 44 inches wide with said jets being substantially ½" apart along said slide, said air chambers being substantially 44" long and substantially 12" wide and substantially 3" thick, and said board being substantially 21" long, substantially 2" thick and substantially 12" wide at the rear tapering to substantially 10" wide at the front thereof.

8. In the apparatus of claim 1 wherein said slide, said board and said air chambers are of vinyl material.

9. In the apparatus of claim 1 including anchoring means associated with said slide and said air chambers for anchoring the same to a supporting surface.

10. In a wave surfing simulation apparatus comprising:

a flat planar elongated flexible slide having an upper planar surface and a lower planar surface with an elongated water chamber extending along at least one side thereof, a water inlet in fluid communication with one end of said water chamber, said water chamber having a plurality of water jets at spaced locations along the upper surface thereof adapted to spray water across substantially the entire upper surface of said slide when said inlet is coupled to a source of water; and a plurality of inflated air chambers associated with the lower planar surface of said slide extending transverse to the longitudinal axis, each of said air chambers being substantially oval in cross-section thereof providing an undulating surface to the upper planar surface of said slide and a smooth transition from said upper planar surface over said undulating surface.

11. In the apparatus of claim 10 wherein each of said air chambers includes an inflatable tube having apertured flanges at each end thereof for receiving U-shaped anchors therein to anchor both ends of each of said tubes to a supporting surface.

12. Surfing simulation apparatus comprising:

a flat planar elongated flexible slide having an upper planar surface and a lower planar surface with an elongated water chamber along at least one side thereof, a water inlet in fluid communication with one end of said water chamber said water chamber having a plurality of water jets at spaced locations along the upper surface thereof adapted to spray water across substantially the entire upper surface of said slide when said inlet is coupled to a source of water; and a simulated inflated belly board having a substantially flat bottom adapted to glide over the upper planar surface of said slide thereby providing a cushioning effect of a buoyant [water] *air* chamber over the wetted surface of the slide, at least one longitudinally extending raised surface on said slide extending traverse to the longitudinal axis of said slide whereby said belly board may glide over said raised surface providing a wave simulation, said raised surface being an inflatable chamber.

13. In the apparatus of claim 12 wherein said raised surface is curved and smooth and free of sharp corners.

14. A wave surfing simulation apparatus for use in connection with a source of water, comprising:

a substantially flat planar elongated flexible slide having a flat elongated sliding portion and at least one inflatable chamber associated with said flat sliding portion and extending transverse to the longitudinal axis thereof, said chamber providing a wave simulating bump that substantially traverses the entire width of said slide, whereby a user of the apparatus glides along said flat elongated sliding portion of said slide and over said wave simulating bump.

15. In the apparatus of claim 14, wherein said at least one inflatable chamber comprises two inflatable chambers provided at spaced locations of said slide.

16. In the apparatus of claim 14, further including a simulated belly board having a substantially flat bottom adapted to glide over said flat elongated sliding portion and said wave simulating bump.

17. In the apparatus of claim 16 wherein said board is inflatable.

* * * * *

UNITED STATES PATENT AND TRADEMARK OFFICE

CERTIFICATE OF CORRECTION

PATENT NO. : Re. 34,042

DATED : August 25, 1992

INVENTOR(S) : Dennis Merino

It is certified that error appears in the above-identified patent and that said Letters Patent is hereby corrected as shown below:

Column 6, lines 5 through 25, claims 14 through 17 should be underlined.

Signed and Sealed this

Twenty-sixth Day of October, 1993

*Attest:*

Bruce Lehman

BRUCE LEHMAN

*Attesting Officer*

*Commissioner of Patents and Trademarks*